Patented Nov. 9, 1948

2,453,308

UNITED STATES PATENT OFFICE 2,453,308

POLYVINYL BUTYRAL COMPOSITION

Richard D. Dunlop, Longmeadow, Mass., assignor to Monsanto Chemical Company, St. Louis, Mo., a corporation of Delaware No Drawing. Application July 21, 1943,
Serial No. 495,603

1 Claim. (Cl. 260—45.2)

This invention relates to combinations of polyvinyl acetal resins with ethers of aminotriazine-aldehyde reaction products and more particularly to combinations of polyvinyl acetal resins and ethers of melamine-formaldehyde reaction products.

Polyvinyl acetal resins and their plasticized compositions have many advantageous characteristics as is known to those skilled in the art. However, the lack of form stability especially at elevated temperatures and the solubility of certain of the compositions has restricted their use to some degree. It is an object of this invention to provide improved polyvinyl acetal resin compositions. Another object is to provide polyvinyl acetal resin compositions with increased form stability. A further object is to provide polyvinyl acetal resin compositions with increased resistance to the action of solvents.

According to the present invention, improved compositions are prepared by combining etherified aminotriazine-aldehyde reaction products with polyvinyl acetal resins. More particularly, improved compositions are prepared by reacting etherified amino-triazine-aldehyde reaction products with polyvinyl acetal resins. Still more particularly, improved compositions are prepared by reacting methylol melamine ethers with polyvinyl partial acetal resins containing free hydroxyl groups.

Polyvinyl acetal resins may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. patent to Morrison et al Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower aliphatic aldehydes are preferred. In particular, polyvinyl acetal resins made with saturated aliphatic aldehydes containing less than 6 carbon atoms and especially those made with formaldehyde, acetaldehyde and butyraldehyde and mixtures thereof are preferred. When the polyvinyl acetal resins contain ester groups, the nature of the ester groups may be substantially varied, but are preferably residues of saturated lower aliphatic acids such as formic acid, acetic acid, propionic acid and butyric acid. The degree of polymerization of the polyvinyl esters used in making the polyvinyl acetals, as evidenced by the viscosity of solutions thereof may be substantially varied, for example, the viscosities of 1 molar benzene solutions at 20° C. may vary from 5-75 centipoises. In making the polyvinyl acetal resins from about 30 to about 95% of the ester groups are replaced by acetal groups.

According to one embodiment of this invention, the polyvinyl acetal resins employed contain, on a weight basis, at least 5% hydroxyl groups calculated as polyvinyl alcohol, and preferably from 5 to 25% hydroxyl groups. These resins may also contain from 0 to 40% ester groups calculated as polyvinyl ester, the ester groups preferably being acetate.

According to one embodiment of this invention, when the acetal groups are butyraldehyde acetal, the resins employed may be considered to be made up, on a weight basis, of 12-22% hydroxyl groups calculated as polyvinyl alcohol, 15-30% acetate groups calculated as polyvinyl acetate, and the balance substantially butyraldehyde acetal. According to another embodiment of this invention, when the acetal groups are butyraldehyde acetal, the resins employed may be considered to be made up, on a weight basis, of 12-22% hydroxyl groups calculated as polyvinyl alcohol, and less than 3% acetate groups calculated as polyvinyl acetate and the balance substantially butyraldehyde acetal.

According to one embodiment of this invention, when the acetal groups are acetaldehyde acetal, the polyvinyl acetal resin employed may be considered to be made up, on a weight basis, of 5 to 15% hydroxyl groups calculated as polyvinyl alcohol, 15-20% acetate groups calculated as polyvinyl acetate and the balance substantially acetaldehyde acetal.

According to one embodiment of this invention, when the acetal is formaldehyde acetal, the polyvinyl acetal resin may be considered to be made up, on a weight basis, of 5-10% hydroxyl groups calculated as polyvinyl alcohol, 8-15% acetate groups calculated as polyvinyl acetate and the balance substantially formaldehyde acetal.

An example of a mixed acetal resin is one containing on a weight basis, 13% hydroxyl groups calculated as polyvinyl alcohol, 2-6% acetate groups calculated as polyvinyl acetate and the balance 65–50 mol per cent acetaldehyde acetal and 35–50 mol per cent butyraldehyde acetal.

Etherified melamine-formaldehyde reaction products may be prepared by reacting melamine, formaldehyde and an alcohol, preferably a monohydric alcohol. According to one embodiment of this invention, the ethers are prepared by reacting formaldehyde and melamine to produce an intermediate reaction product and the resulting product is then reacted with a monohydric alcohol. Melamine-formaldehyde intermediate reaction products comprise methylol derivatives of melamine or mixtures thereof and condensation products of these methylol derivatives. Thus, mono-, di-, tri-, tetra-, penta-, and hexa-methylol melamines or mixtures thereof and their condensation products containing free methylol groups may be prepared and then reacted with an alcohol. The number of methylol groups formed on the melamine molecule depends primarily on the molecular ratio of formaldehyde reacted with melamine and the extent of the condensation of the methylol compounds depends on the temperature at which the reaction is carried out and on the duration of the reaction. However, excessive condensation of the methylol compounds is to be avoided, i. e., formation of infusible, insoluble condensation products.

According to one embodiment of this invention, the methylol melamine ethers contain a sufficient number of etherified methylol groups to give a clear solution in an organic solvent, for example, the etherifying alcohol employed. 2–6 etherified methylol groups for each molecule of melamine are generally required. According to another embodiment the methylol melamine ethers employed are the result of substantially completely etherifying methylol melamine products containing 2–6 methylol groups.

The following is one method by which ethers of methylol melamines may be prepared. Melamine and formaldehyde are reacted in the desired molar ratio, for example, 3 mols of formaldehyde in an aqueous 37% solution for each mol of melamine, in the presence of sufficient sodium hydroxide to produce initially a pH of 9.3 (glass electrode). The reaction is carried out with agitation at atmospheric pressure at a temperature of substantially 80–90° C. As soon as the mixture becomes clear, indicating that the melamine has reacted, the solution is diluted with an equal volume of water and allowed to cool. On cooling, a crystalline product is formed which is separated by filtration. The crystalline product is found to be substantially trimethylol melamine when a molar ratio of formaldehyde to melamine of 3:1 is used.

The crystalline product obtained as described above is treated with ethyl alcohol in substantial excess of the amount needed to react with all of the methylol groups present, for example, five times the theoretical amount at a temperature of about 40° C. after the addition of sufficient phosphoric acid to produce a pH of about 4–5. The reaction is continued until a clear solution is formed and thereafter the pH of the solution is adjusted by the addition of sodium hydroxide to about 8.3 (phenol phthalein indicator). Then the solution is cooled to about 25° C. whereupon a precipitate is formed comprising sodium phosphate crystals. These crystals are separated by filtration and the filtrate concentrated by vacuum distillation to the desired solids content, for example, about 70% solids. This resulting product comprises essentially an alcohol paste or slurry of the ether of the methylol melamine, in this case substantially triethyl ether of trimethylol melamine.

Included within the scope of this invention are various methylol melamine ethers. According to one embodiment of this invention the ethers employed are alkyl ethers of di-, tri-, tetra-, penta-, and hexa-methylol melamine, or mixtures thereof, in which the alkyl radical contains less than 7 carbon atoms. Examples of such ethers are the di-, tri-, tetra-, penta- and hexaethyl ethers of di-, tri-, tetra-, penta- and hexamethylol melamines, respectively, tri-propyl, tri-butyl, tri-hexyl and tri-amyl ethers of tri-methylol melamine. A particular embodiment of this invention comprises the use of the ethyl ethers of tri-, tetra-, penta-, and hexamethylol melamine or mixtures thereof.

The following examples set forth certain embodiments of the present invention. Where parts are given, they are parts by weight.

The polyvinyl butyraldehyde acetal resin employed in Examples I–III and VII–XI is prepared from a polyvinyl acetate of such a degree of polymerization that a one-molar benzene solution possesses a viscosity of substantially 50–55 centipoises at 20° C. The polyvinyl butyraldehyde acetal resin may be considered to be made up on a weight basis of 16–20% hydroxyl groups calculated as polyvinyl alcohol, less than 3% acetate groups calculated as polyvinyl acetate and the balance substantially butyraldehyde acetal. The methylol melamine ethers are prepared by the method given above.

*Example I*

| | Parts |
|---|---|
| Polyvinyl butyraldehyde acetal resin | 100 |
| Dibutyl sebacate | 25 |
| Tetraethyl ether of tetramethylol melamine | 5 |

The dibutyl sebacate is thoroughly mixed with the polyvinyl acetal resin in a suitable manner, for example, by means of a Banbury mixer, and the resulting mixture is transferred to milling rolls heated to a temperature of about 80° C. An alcohol slurry of the methylol melamine ether is then slowly added on the rolls, the solvent removed by evaporation and a uniform mix is produced. The resulting product is a transparent, homogeneous, rubbery mass capable of being dissolved in certain solvents, for example, ethanol, ethyl lactate and the like and capable of being molded by the application of heat and pressure, to form transparent, infusible, insoluble products.

Thus, the product described above may be molded, for example, in a cup-shaped mold, by subjecting the mixture to a temperature of 140° C. for 15 minutes under a pressure of 500 pounds per square inch, and then removed from the mold after cooling to about 90° C. During the molding operation a thermo-setting reaction takes place with the result that a transparent, infusible product is formed which maintains its molded form at the relatively high temperature at which it is removed from the mold. Furthermore, the product does not dissolve in solvents for the polyvinyl acetal resin such as ethanol or ethyl lactate.

Preferably, a suitable lubricant, for example, one part of stearic acid, is added to the mixture on the rolls to prevent sticking to the mold during the molding operation. The addition of 1 part of an antioxidant, for example p-cyclohexyl phenol or resorcinol, serves to improve the weather resistance of the resulting product.

Example II

Example I is repeated except that 2.5 parts of the methylol melamine ether are employed in place of 5 parts.

Example III

Example I is repeated except that 10 parts of the methylol melamine ether are employed in place of 5 parts.

The products described in Examples II and III possess substantially the same characteristic properties as the product of Example I although the thermosetting reaction is somewhat accelerated or retarded by an increase or decrease respectively in the proportions of the methylol melamine ether. In place of tetra-ethyl ether of tetra-methylol melamine, the corresponding tri-, penta- and hexaderivatives may be employed in Examples I, II and III to produce compositions having substantially the same characteristic properties.

In contrast to the molded products made as described above in Example I, a composition consisting of 100 parts of the same polyvinyl acetal resin and 25 parts of dibutyl sebacate when molded under the same conditions, must be cooled substantially to room temperature before removal from the molds in order to maintain the molded form. The latter molded product is completely soluble in such solvents as methanol, ethanol, and ethyl lactate while the molded product made from the composition described in Example I swells to some extent when subjected to the action of the same solvents, but does not dissolve therein.

In further contrast to Example I, an attempt to incorporate non-etherified tetra-methylol melamine in place of the ether derivative thereof in the same polyvinyl acetal resin composition results in an opaque product. Thus, it is seen that among the unexpected results is the compatibility of the methylol melamine ethers in polyvinyl acetal resins in contrast to the methylol melamines per se and the continued homogeneity and transparency of the product after conversion to the insoluble, infusible state.

As further evidence of the unexpected characteristics of the products obtainable according to this invention, comparative flow tests are carried out on the composition described in Example I before and after subjecting the composition to heat treatment. These tests are carried out by means of the Rossi-Peakes flow tester (A. S. T. M. D569–41T) at 107° C. under a pressure of 100 pounds per square inch. The following table shows the results of such tests conducted on the composition of Example I after varying heat treatments. The results are expressed in terms of inches flow in 2 minute periods.

| Heat treatment | Flow |
| --- | --- |
| None | 0.60 |
| 30 minutes at 99° C | 0.36 |
| 60 minutes at 99° C | 0.18 |
| 15 minutes at 110° C | 0.24 |
| 30 minutes at 110° C | 0.12 |
| 60 minutes at 110° C | 0.05 |
| 15 minutes at 132° C | 0.06 |
| 30 minutes at 132° C | 0.04 |
| 10 minutes at 160° C | 0.03 |

Tests on a similar composition that did not contain any tetra ethyl ether of tetra methylol melamine gives flow values both before and after the heat treatments referred to above that are substantially the same as the values obtained on the composition described in Example I prior to heat treatment. These results clearly show the effect of the tetra ethyl ether of tetra methylol melamine on the fusibility or plasticity of plasticized polyvinyl acetal resin and coupled with the effect on solubility, demonstrate that some sort of cross linking or other chemical reaction takes place between the methylol melamine ether and the polyvinyl acetal resin.

While the present invention is not limited to any particular theory of operation, it is believed that heat treatment of the combinations of the aminotriazine-aldehyde ethers and the polyvinyl acetal resins unexpectedly causes reaction between the ethers and the polyvinyl acetal resins, and particularly with hydroxyl groups thereof when such are present, releasing small amounts of reaction products of the groups used to etherify the amino - triazine - aldehyde product, with hydrogen or other residues removed from the polyvinyl acetal resin.

Example IV

| | Parts |
| --- | --- |
| Polyvinyl formaldehyde acetal resin | 100 |
| Diethyl phthalate | 80 |
| Tetraethyl ether of tetra methylol melamine | 10 |

The polyvinyl formaldehyde acetal resin used in this example is made from polyvinyl acetate having a viscosity of 15–20 centipoises at 20° C. in a 1 molar benzene solution and may be considered to be made up on a weight basis of 8% hydroxyl groups calculated as polyvinyl alcohol, 12% acetate groups calculated as polyvinyl acetate and the balance substantially formaldehyde acetal. The polyvinyl acetal resin is mixed with the plasticizer in a Banbury mixer and thereafter the tetra ethyl ether of tetra methylol melamine in ethanol solution is mixed with the resulting plastic mass heated to a temperature of 105–110° C. The resulting homogeneous, transparent plastic is formed into a press cake in the well-known manner for cellulose ester plastics by pressing at a pressure of about 275 pounds per square inch and at a temperature corresponding to 40 pounds steam pressure for 20 minutes. The resulting press cake is cooled to about room temperature and sheets are cut therefrom in the well-known manner. The resulting sheets are clear and transparent.

While the combination of polyvinyl formaldehyde acetal resin and plasticizer is readily dissolved in ethylene dichloride, sheets formed as described above after heating for about 5 minutes at 135° C. swell but do not dissolve as a result of immersion in ethylene dichloride and after 10 minutes heating at 135° C. the effect of immersion in ethylene dichloride is further reduced. In addition, the sheets are still clear and transparent after the heat treatments described above.

Example V

Example IV is repeated except that 5 parts of tetraethyl ether of tetra methylol melamine is employed instead of 10 parts. The press cake is baked for 20 minutes at a temperature corresponding to 40 pounds per square inch steam pressure. Sheets that are heated for 20 minutes at 135° C. swell, but do not dissolve in ethylene dichloride.

Example VI

| | Parts |
| --- | --- |
| Polyvinyl acetaldehyde acetal resin | 100 |
| Diethyl phthalate | 30 |
| Tetra amyl ether of tetra methylol melamine | 5 |

The polyvinyl acetaldehyde acetal resin used in this example is made from polyvinyl acetate having a viscosity of 10–15 centipoises at 20° C. in a 1 molar benzene solution and may be considered to be made up on a weight basis of 7% hydroxyl groups calculated as polyvinyl alcohol, 17% acetate groups calculated as polyvinyl acetate and the balance substantially acetaldehyde acetal. Compositions produced as described in previous examples possess thermosetting properties.

The method given hereinbefore for preparing the methylol melamine ethers for use according to this invention may be substantially varied. For example, the melamine and formaldehyde may be reacted further before being subjected to the etherification reaction. According to one embodiment, the melamine is reacted with the formaldehyde solution until a precipitate is formed when a portion of the reaction product is passed into ice water. While further reaction of the melamine and formaldehyde may take place before the methylol groups are etherified, it is generally desirable to stop the reaction before precipitation of the melamine formaldehyde reaction product takes place. The melamine-aldehyde addition compound is preferably made under alkaline conditions in the presence of such condensing agents as sodium hydroxide, quaternary ammonium hydroxides such as dimethyl dibenzyl ammonium hydroxide, trimethyl benzyl ammonium hydroxide, tetraethyl ammonium hydroxide, tetraethanol ammonium hydroxide, ethylene diamine, ammonia and the like. According to one embodiment of this invention, the methylol compounds employed are the products of reacting 2–6 and preferably 3–6, molecular proportions of formaldehyde with each molecular proportion of melamine.

An alternative method of forming the etherified melamine-formaldehyde product comprises the use of the aqueous melamine-formaldehyde reaction product without separation of the methylol melamine crystals or condensed methylol melamine compounds. When operating in this manner, it is desirable to simultaneously dehydrate the reaction mixture, for example, by distillation, while continuously supplying the alcohol used to etherify the methylol melamine.

According to another method, the aqueous melamine-formaldehyde reaction product is evaporated to dryness, preferably under reduced pressure at moderately elevated temperatures and the product obtained is then etherified as described hereinbefore.

Another method of producing etherified methylol melamine products is to react simultaneously melamine, formaldehyde and an excess of alcohol. This procedure may be carried out by boiling the mixture under reflux conditions for several hours followed by dehydration, for example, by distillation under such conditions that an excess of the alcohol is present at all times.

In preparing ethers with the higher alcohols it is desirable to have present either a low boiling alcohol such as methanol or ethanol or to form first the ether of the low boiling alcohol and then replace the lower alkyl group by reaction with the higher alcohol.

The foregoing methods for preparing methylol melamine products and etherified melamine-formaldehyde products may also be used for the preparation of the amino-triazine-aldehyde products within the scope of this invention.

Regardless of the method employed for preparing the methylol melamine ethers it is generally desirable that the reaction take place under acid conditions although alkylation under neutral or alkaline conditions is not precluded.

The amount of the ethers incorporated in the polyvinyl acetal resins may be substantially varied. For certain purposes as little a 0.1% of the ether may be added to the polyvinyl acetal resin to produce beneficial results. For other purposes, the amount of the ether may be increased to 20–25% or more based on the amount of polyvinyl acetal resin used. When it is desired to prepare a composition capable of being molded under heat and pressure to produce a transparent, themoset product, from 2–10% of the ether is desirable, particularly when the ether is prepared from a methylol melamine containing from 2–6 methylol groups and etherified with an excess of a monohydric alcohol containing less than 7 carbon atoms. The manner in which the ethers are incorporated into the polyvinyl acetal resins may be substantially varied. Thus, the ethers may be added in solution in organic solvents such as ethanol, methanol, etc., or as a paste or slurry therewith, or in a molten condition or in the solid state.

Preferably, the compositions of the invention include a plasticizer, but when advantageous the plasticizer may be omitted.

Included within the scope of this invention are ethers of aminotriazine-aldehyde reaction products in which the residues of the alcohols or other substances employed in preparing the ethers vary widely in their chemical structures. Thus, the residues may comprise aliphatic, aromatic, aliphatic-aromatic, aromatic-aliphatic, hydro-aromatic and heterocyclic radicals. As examples of such radicals may be mentioned ethyl, propyl, butyl, amyl, phenyl, benzyl, toluyl, laryl, cetyl, allyl, stearyl, oleyl, furfuryl, cyclohexyl and the like. When the ethers are made from alcohols, monohydric or polyhydric alcohols or mixtures thereof may be employed, although monohydric alcohols are preferred. Examples of such alcohols are methyl alcohol, ethyl alcohol, propyl alcohol, butyl alcohol, ethyl butanol, ethyl hexanol, lauryl alcohol, stearyl alcohol, benzyl alcohol, ethylene glycol, diethylene glycol, glycerol, sorbital, terpineol, furfuryl alcohol and the like.

A preferred group of ethers comprises alkyl ethers of methylol melamine, particularly those in which the alkyl group is one containing less than 7 carbon atoms. When desired the alkyl groups may be substituted for example, with halogen atoms. Examples of such substituted groups are mono-, di-, and tri-chloro-ethyl, -propyl, -butyl and -amyl radicals.

Included within the scope of this invention are other aldehyde-reactable aminotriazines than melamine. Examples of other aminotriazines include substituted melamines, for example, chlorinated, alkylated, or phenylated melamines, deaminated melamines, for example, ammeline, ammelide and the like. Other examples of aminotriazines are 2,4,6-triethyl and triphenyl-triamino-1,3,5-triazines, 2,4,6-trihydrazino-1,3,5-triazine, and the corresponding condensed triazines such as melam and melem, 2-amino-1,3,5-triazine, 2-chloro-4,6-diamino-1,3,5-triazine, 2-phenyl-4-amino-6-hydroxyl-1,3,5-triazine and 6-methyl-2,4-diamino-1,3,5-triazine. Mixtures of aminotriazines are also included within the scope of this invention. When the particular aminotriazine employed contains less than 6 aldehyde-replaceable hydrogen atoms, the upper limit of the proportion of formaldehyde employed may be reduced. In general, when thermosetting products are desired it is preferred that the aminotriazine have at least two aldehyde-replaceable hydrogen atoms attached to aminido nitrogen atoms.

While formaldehyde (or compounds engendering formaldehyde), particularly aqueous solutions of formaldehyde is the preferred aldehyde employed for reaction with melamine or other aminotriazine, other aldehydes are included within the scope of this invention. As examples may be mentioned aliphatic aldehydes such as acetaldehyde, propionaldehyde, butryraldehyde, heptaldehyde, hexaldehyde and furfural; unsaturated aldehydes such as acrolein, methacrolein and crotonaldehyde; arromatic aldehydes such as benzaldehyde; and mixtures of the foregoing aldehydes. Thus, the ethers may be prepared from the reaction products of aminotriazines and aldehydes broadly. A particular group of aminotriazine-aldehyde addition products are those prepared from aliphatic aldehydes which may be termed alkylol-aminotriazines and particularly contemplated are those alkylol-aminotriazines in which the alkyl group contains less than 7 carbon atoms.

The compositions of the present invention set forth in the examples above may be employed for various uses and, in particular, those uses wherein the transparency and thermosetting characteristics of those products are advantageous. For example, the compositions described in the examples above may be employed in forming molded products; in forming transparent sheets, for use as tent windows and other applications where a transparent self-supporting plastic sheet is required; as interlayers in laminated glass; for coating or cementing materials such as wood, cloth or other textiles, paper, glass sheets, glass fibers, metals, articles made from plastic materials such as those made from synthetic resins and the like.

The following examples illustrate certain applications of the products of this invention.

Example VII

| | Parts |
|---|---|
| Polyvinyl butyraldehyde acetal resin | 100 |
| Dibutyl sebacate | 40 |
| Tetraethyl ether of tetramethylol melamine | 10 |

The polyvinyl acetal resin and the dibutyl sebacate are mixed in a Banbury mixer and the resulting plastic mass transferred to Thropp rolls heated to a temperature of 80° C. Thereafter the tetraethyl ether of tetramethylol melamine is added and mixed in to give a homogeneous transparent rubbery composition. This composition is then formed into a press cake by the well-known method for cellulose ester plastics. In forming the press cake the mass is pressed at about 150 pounds per square inch and at a temperature corresponding to 40 pounds per square inch steam pressure for 30 minutes. The resulting press cake is cooled to about room temperature and skived into sheets 0.015 inch thick.

The resulting sheets are then placed between glass sheets substantially 0.125 inch in thickness and the composite so formed is subjected to a temperature of 135° C. at a pressure of about 180 pounds per square inch for 15 minutes, whereby the plastic interlayer is converted into its insoluble, infusible state and securely welds the glass sheets together into a clear transparent product. When the product is subjected to hammer blows the glass breaks but the broken particles are substantially retained by the plastic interlayer. In addition the product possesses good impact strength at both high and low temperatures when subjected to the well-known falling ball test.

Example VIII

A web of cloth, for example duck cloth, is coated with the homogeneous rubbery composition described in Example I in a suitable manner, for example, by calendering at about 95° C. and thereafter the coated cloth is subjected to a temperature of about 130° C. to cause the coating to become thermoset. The product is a flexible, tough, solvent-resistant material, admirably adapted for raincoat, tent covering, and other applications involving exposure to outside conditions.

Example IX

A sheet of kraft paper is coated and impregnated with a 20% ethanol solution of the product described in Example I and thereafter the ethanol is removed by evaporation at about 75° C. The resulting product may then be subjected to higher temperature conditions in order to cause the plastic material to become thermoset, for example, about 125° C. The product so formed is highly flexible and resistant to the passage of moisture. Such a product is useful for wrapping and like purposes where exclusion of moisture is desirable. When desired, a more dilute solution of the product described in Example I may be employed so as to impregnate the paper without forming a continuous coating thereon. Such a treatment has the effect of improving the wet strength of the paper without impairing other desirable properties.

The following example illustrates the preparation of face protective masks.

Example X

| | Parts |
|---|---|
| Polyvinyl butyraldehyde acetal resin | 100 |
| Butyl ricinoleate | 35 |
| Plasticizer S. C.[1] | 15 |
| Stearic acid | 1 |
| Tetraethyl ether of tetramethylol melamine | 5 |

[1] A glycol ester of vegetable oil acids. Other plasticizers such as dibutyl sebacate or triethylene glycol dihexoate may be used.

The above ingredients are mixed in the manner described in Example I. A suitable amount of the resulting homogeneous transparent composition is placed in a suitable steel mold of the compression molding type. A pressure of 500 pounds per square inch is applied and then heat is applied. The temperature is then raised to about 150° C. for about 6 minutes. Then the mold is cooled under pressure until the temperature drops to about 75° C. The foregoing complete cycle takes about 15 minutes.

The product is a clear, insoluble, infusible, transparent, flexible, tough and substantially gas-resistant product admirably adapted for the purpose set out above or other purposes requiring similar properties. In particular, the product is free from tackiness and retains its shape well even at elevated temperatures.

Example XI

This is an example illustrating the use of the products of this invention for cementing purposes.

| | Parts |
|---|---|
| Polyvinyl butyraldehyde acetal resin | 100 |
| Dibutyl sebacate | 37 |
| Triethyl ether of trimethylol melamine | 10 |

The above ingredients are mixed in the manner described in Example IV. To 100 parts of the resulting homogeneous rubbery composition is added 5.0 parts of the following accelerator solution.

| | Parts |
|---|---|
| Monoethyl phosphoric acid | 21 |
| Ethanol | 100 |

The resulting mix is a cement that becomes thermoset at room temperature and is highly advantageous for cementing articles made of or coated with thermoset polyvinyl acetal resin-phenol-aldehyde compositions.

Other accelerators may be employed in place of monoethyl phosphoric acid, for example, di-ethyl phosphoric acid, hydrochloric acid, benzene sulfonic acid.

Among other uses may be mentioned the preparation of emulsions, particularly aqueous emulsions, for coating purposes.

Thus, the composition of Example I may be dispersed in water by means of a colloid mill or the like in the presence of such a dispersion agent as polyvinyl alcohol. Such products may be used to coat wood, paper and the like and thereafter be cured to the insoluble state by the action of heat. When advantageous, the resin may be converted into its insoluble state after the dispersion in an aqueous or organic liquid and then used for coating purposes. Such a dispersion is highly advantageous as a bonding material for plywood.

Products prepared according to this invention may be substituted for rubber for certain purposes. For example, the composition described in Example X may be employed in place of rubber in forming transparent tubing used, for example, in conveying blood plasma.

When desired, suitable fillers such as wood flour, carbon black, powdered mica and the like, dyestuffs, pigments and the like may be incorporated in the products of the present invention. It may be desirable to incorporate agents to accelerate the rate of hardening as for example 1-10 parts of a metal oxide such as zinc oxide, borax, salicylic acid, etc., for every 100 parts of the polyvinyl acetal resin. When it is desirable to retard the hardening rate, such materials as quaternary ammonium hydroxides are effective, for example, 0.5 parts of trimethyl benzyl ammonium hydroxide or tetraethyl ammonium hydroxide for each 100 parts of the polyvinyl acetal resin.

What is claimed is:

A composition of matter comprising 100 parts of a polyvinyl butyraldehyde acetal resin containing, on a weight basis, from 5–25% hydroxy groups calculated as polyvinyl alcohol, 37 parts of dibutyl sebacate, 10 parts of the ethyl ether of trimethylol melamine and 1.3 parts of monoethyl phosphoric acid, said ether being incorporated while in the fusible state.

RICHARD D. DUNLOP.

REFERENCES CITED

The following references are of record in the file of this patent:

UNITED STATES PATENTS

| Number | Name | Date |
|---|---|---|
| Re. 20,430 | Morrison | June 29, 1937 |
| 2,197,357 | Widmer et al. | Apr. 16, 1940 |
| 2,243,560 | Hall et al. | May 27, 1941 |
| 2,274,447 | Hodgins et al. | Feb. 24, 1942 |
| 2,326,698 | Swain et al. | Aug. 10, 1943 |
| 2,329,622 | Johnstone et al. | Sept. 14, 1943 |
| 2,368,451 | D'Alelio | Jan. 30, 1945 |
| 2,396,098 | Haas | Mar. 5, 1946 |
| 2,423,565 | Rodman | July 8, 1947 |

OTHER REFERENCES

Pages 2 and 3, "Resinous Reporter," May 1943, vol. IV, No. 2, pub. by Resinous Products and Chemical Co., Philadelphia, Pa.

Pages 769, 771, 772, 778, 779, Hodgins et al., Ind. & Eng. Chem., June 1941.

Pages 45–48 and 51, "Uformite," pub. Apr. 1941, by Resinous Products and Chemical Co., Philadelphia.